United States Patent [19]
Johnson et al.

[11] Patent Number: 5,358,542
[45] Date of Patent: Oct. 25, 1994

[54] GLASS CONTAINER FORMING MACHINE INCLUDING NECK RING MOLD COOLING

[75] Inventors: Robert S. Johnson; Robert D. Hall, Sr.; Roger L. Erb, all of Marion, Ind.

[73] Assignee: American National Can Company, Chicago, Ill.

[21] Appl. No.: 987,655

[22] Filed: Dec. 9, 1992

[51] Int. Cl.⁵ .............................. C03B 9/00; C03B 9/38
[52] U.S. Cl. ........................................ 65/265; 65/267; 65/355; 65/356; 65/360
[58] Field of Search ................. 65/356, 319, 265, 267, 65/355, 360, 162

[56] References Cited

U.S. PATENT DOCUMENTS

| | | | |
|---|---|---|---|
| 3,332,765 | 7/1967 | Champlin | 65/162 |
| 3,372,017 | 3/1968 | Pitbladdo | 65/162 |
| 3,630,707 | 12/1971 | Ayers | 65/162 |
| 3,762,907 | 10/1973 | Quinn et al. | 65/164 |
| 3,838,997 | 10/1974 | Becker et al. | 65/356 |
| 3,849,101 | 11/1974 | Wythe et al. | 65/356 |
| 3,854,921 | 12/1974 | Jones | 65/161 |
| 3,860,407 | 1/1975 | Fertik | 65/161 |
| 3,888,647 | 6/1975 | Breeden et al. | 65/356 |
| 3,915,682 | 10/1975 | Chotin et al. | 65/29 |
| 4,052,187 | 10/1977 | Spaeth et al. | 65/160 |
| 4,067,711 | 1/1978 | Jones | 65/319 |
| 4,070,174 | 1/1978 | Nebelung et al. | 65/229 |
| 4,142,884 | 3/1979 | Jones, Jr. | 65/356 |
| 4,152,132 | 5/1979 | Zappia | 65/76 |
| 4,251,253 | 2/1981 | Becker et al. | 65/267 |
| 4,273,569 | 6/1981 | Staley | 65/360 |
| 4,361,434 | 11/1982 | Schneider | 65/265 |
| 4,362,544 | 12/1982 | Mallory | 65/163 |
| 4,490,164 | 12/1984 | Nebelung et al. | 65/267 |
| 4,502,879 | 3/1985 | Foster | 65/267 |
| 4,505,730 | 3/1985 | Foster | 65/162 |
| 4,512,792 | 4/1985 | Irwin et al. | 65/161 |
| 4,525,191 | 6/1985 | Fenton | 65/83 |
| 4,528,015 | 7/1985 | Abbott et al. | 65/162 |
| 4,555,258 | 11/1985 | Curiel | 65/319 |
| 4,557,744 | 12/1985 | Fenton et al. | 65/29 |
| 4,578,104 | 3/1986 | Jones | 65/267 |
| 4,629,488 | 12/1986 | Doud et al. | 65/356 |
| 4,657,573 | 4/1987 | Jones | 65/265 |
| 4,657,574 | 4/1987 | Foster | 65/265 |
| 4,659,357 | 4/1987 | Doud | 65/356 |
| 4,668,269 | 5/1987 | Cantu-Garcia et al. | 65/68 |
| 4,690,703 | 9/1987 | Kulig | 65/265 |
| 4,701,202 | 10/1987 | Foster | 65/265 |
| 4,701,203 | 10/1987 | Schneider | 65/265 |
| 4,708,730 | 11/1987 | Ziegler et al. | 65/265 |
| 4,750,929 | 6/1988 | Bolin | 65/265 |
| 4,783,212 | 11/1988 | Loffler | 65/265 |
| 4,812,156 | 3/1989 | Virey et al. | 65/83 |
| 4,813,995 | 3/1989 | Knoth et al. | 65/267 |
| 4,824,461 | 4/1989 | Cavazos | 65/356 |
| 4,842,637 | 6/1989 | Bolin et al. | 65/265 |
| 4,909,823 | 3/1990 | Bolin | 65/265 |
| 4,983,203 | 1/1991 | Erb et al. | 65/265 |

*Primary Examiner*—W. Gary Jones
*Assistant Examiner*—Steven P. Griffin
*Attorney, Agent, or Firm*—Wallenstein, Wagner & Hattis, Ltd.

[57] ABSTRACT

A cooling system for neck ring molds in a glass molding machine having retractable parison-forming molds engageable with the neck rings employs air jets directed at exposed portions of the neck ring molds. The neck ring molds are configured to extend out of the bottom of the main parison mold and to engage with neck ring hangers. The neck ring molds are configured sufficiently long that a space is created between the bottoms of the main parison molds and the hangers to permit direct access to portions of the neck ring mold. Air supplied in the form of air jets from a pair of cooling air plenums is directed at the exposed portions of the neck ring molds to provide cooling.

10 Claims, 5 Drawing Sheets

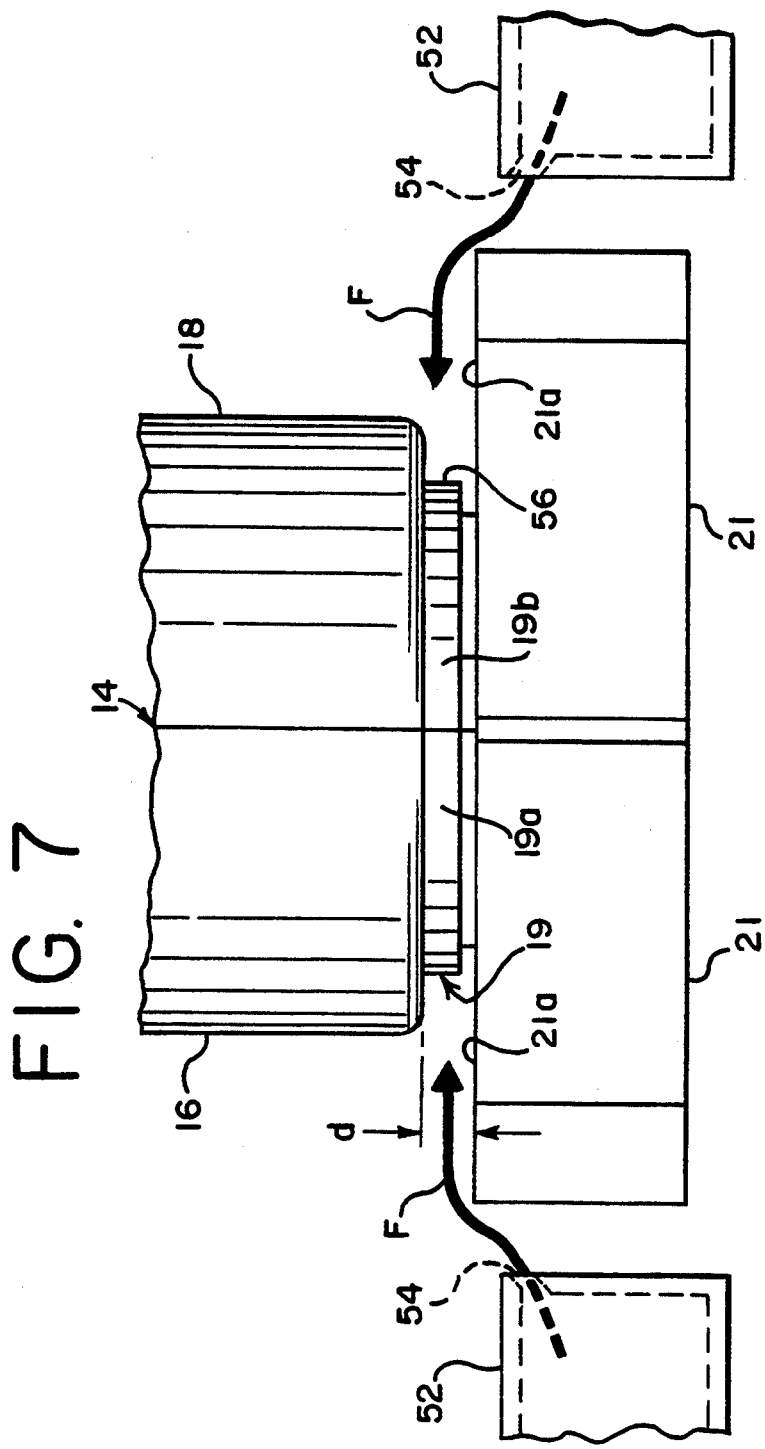

GLASS CONTAINER FORMING MACHINE INCLUDING NECK RING MOLD COOLING

DESCRIPTION

Technical Field

This invention relates generally to an apparatus for cooling molds used to form glass containers. More particularly, it pertains to an apparatus which provides cooling to neck ring molds.

BACKGROUND OF THE INVENTION

Glass containers, including glass bottles, are formed in a process that is well-known in the art. The various components of the glass are heated until they have melted. A gob of this melted glass is next formed into a parison in a so-called blanking or parison mold. The parison formed is moved from the parison mold to a finishing or blow mold, where the finished bottle is shaped.

Mass production of glass bottles is generally carried out in a well-known IS (individual section) glass forming machine which has a plurality of glass forming means integrated into a single plural-section machine fed by a single source of molten glass. The sections are operated in synchronism in such relative phase relationship to permit the several sections to acquire gobs of molten glass in ordered sequence from the single source.

Thus, as one of the sections is receiving a gob from the feeding means, another section is delivering a finished article to an output conveyor and other sections are engaged in various forming steps between receipt of the gob and production of the finished article. The sequence of operation is controlled by a timing mechanism that may be either mechanically or electronically controlled. This timing mechanism sequentially initiates mechanical devices in a predetermined synchronized sequence through automatic control systems.

The IS machines have two types of molds in each individual mold section whereby a gob is received in a first mold, called a parison mold, for the initial process of forming a parison, followed by transfer of the parison to a second mold, called the blow or finishing mold, for blowing the parison to its final configuration. A transfer arm is pivoted between the parison mold and the finishing mold, and the parison is formed in an inverted position in the parison mold and is transferred to the finishing mold in an upright position. This process is generally disclosed in U.S. Pat. No. 3,762,907, incorporated herein by reference.

The parison and finishing molds are subjected to extremely high temperatures. For example, the parison mold can reach temperatures as high as 1200° F. or more, while the finishing mold can reach temperatures as high as 1100° F. As a result, the heat that is transferred to these molds by the gob of molten glass during the molding process cannot be adequately dissipated into the ambient air by convection without slowing down the process.

A variety of auxiliary cooling means or methods have been utilized for these molds. U.S. Pat. No. 4,983,203 issued to Erb et al., and assigned to the assignee of this application, discloses a glass forming system wherein parison mold halves are movable between a retracted position and a closed position at a parison-forming station. A pair of neck ring mold halves forming a neck ring mold are held together at the parison-forming station and are configured for nesting surrounding engagement by the parison mold halves when brought together. The parison mold halves are provided with a number of vertical interior cooling passages generally peripherally disposed within each parison mold half. Mold air supply plenums are provided disposed below each mold half at the retracted station. During the period that the mold halves spend in the retracted state, they are continuously cooled by air flowing from the plenum up through the individual mold cooling passages. This system provides for cooling of the parison mold halves, but relies upon the physical contact between the cooled parison mold halves and the neck ring molds for neck ring mold cooling during the parison-forming operation. The heating of the neck ring mold during cyclic operation of such a glass forming machine has proven to be the speed-limiting factor. A significant reduction of the neck ring mold temperature would allow increased speed of operation.

U.S. Pat. No. 4,629,488, issued to Doud et al., discloses a cooling system for cooling a neck ring mold and the parison mold in the portion of an individual section glass molding machine in which the parison is formed. The means for cooling the neck ring mold and the parison mold includes a plurality of first cooling holes in an upper receiver cap, a plurality of second cooling holes in the neck ring mold that communicate with the plurality of first cooling holes, and a plurality of third cooling holes in the parison mold that communicate with the plurality of second cooling holes. Specifically, the neck ring mold is cooled by a flow of cooling air that flows upwardly through a plurality of vertically disposed and circumferentially spaced second cooling holes in the neck ring mold, and is cooled by a portion of the cooling air flowing radially out through the radially disposed notches in the neck ring mold. The cooling is carried out on the parison mold side of the glassware forming machine since the neck ring mold is on the parison side about 80% of the time during normal operation. In addition, the neck ring mold receives more cooling than the parison mold since it provides mechanical strength and stability to the finish portion.

The Doud system is complex to machine, and hence costly. Additionally, it requires a source of compressed air to be supplied to an inlet port which implies either a rapid plug-in and withdrawal air supply system for each neck ring mold, or in the alternative, a carry-along high pressure manifold which will allow the neck ring mold to be moved from the parison-forming station to the final forming station. Here again, additional complexity is engendered, and a possible loss of reliability through high pressure seal failure may be expected U.S. Pat. No. 4,659,357, issued to Doud, also discloses an apparatus and method for cooling the neck ring mold and parison mold. In this patent, the cooling system utilizes fan air from a fan box for cooling the neck ring mold, thus eliminating the expense of providing compressed air for cooling. Specifically, the neck ring mold is cooled by a flow of fan air that flows upwardly through a plurality of vertically disposed and circumferentially spaced cooling holes in the neck ring mold, and is cooled by a portion of the cooling air flowing radially out through the radially disposed notches in the neck ring mold. The remainder of the fan air is directed upwardly through a plurality of vertically disposed and circumferentially spaced cooling holes in the parison mold. Here again, an expensive series of passages must be machined for each particular design of neck ring mold.

U.S. Pat. No. 4,813,995, issued to Knoth et al., discloses an apparatus for manufacturing containers out of glass which has a cooling means comprised of a ring of nozzles by which jets of cooling air are directed to the neck ring mold portion of the parison mold. The neck ring mold is cooled during heating of the parison to prevent the neck portion of the parison from flowing and causing the collapse of the parison to the bottom of the parison mold cavity. The parison mold itself has an internal cavity to which cooling air is supplied. The air leaves the chamber through cylindrical passages formed in the mold. Here optimal cooling efficiency cannot be secured because the air reaching the neck ring mold is already severely preheated by its passage through the parison mold.

It is an object of the invention to provide a simple low cost way of providing adequate cooling to a neck ring mold at a parison-forming station.

SUMMARY OF THE INVENTION

A glass molding machine employs pairs of parison mold halves having associated therewith a neck ring mold configured for nesting engagement with lower portions of the parison mold halves. The neck ring mold is provided with extensions extending out of the parison mold halves and configured for engagement with movable hanger means for holding the neck ring mold at a parison-forming station. The extensions are dimensioned to leave portions thereof between the bottoms of the parison mold halves and the top of the movable hanger means exposed to direct external access. An air supply is positioned at the parison-forming station and directs a flow of cooling air at exterior surfaces of the neck ring mold extensions, thereby exerting a cooling action even when the parison mold halves are closed around the neck ring mold.

In the preferred form of the invention, the mold halves are carried by mold support arms mounted for rotation about a vertical axis so as to be rotatable between retracted stations and the parison-forming station, and the neck ring mold air supply is provided by plenums disposed between each of the retracted stations and adapted for connection with a source of cooling air. Each of the neck ring mold air supply plenums is disposed at a distance below the path of movement of the lowest portions of the parison mold halves and has sidewalls provided with flow-directing outlet apertures for directing a flow of cooling air towards the exposed neck ring mold extensions.

Other advantages and aspects of the invention will become apparent upon making reference to the specification, claims, and drawings to follow.

BRIEF DESCRIPTION OF THE DRAWINGS

FIG. 7 is a partial end elevational view of the leftmost neck ring mold shown in FIG. 1 showing its support by a pair of support arms.

DETAILED DESCRIPTION OF THE PREFERRED EMBODIMENT

Figure 1:
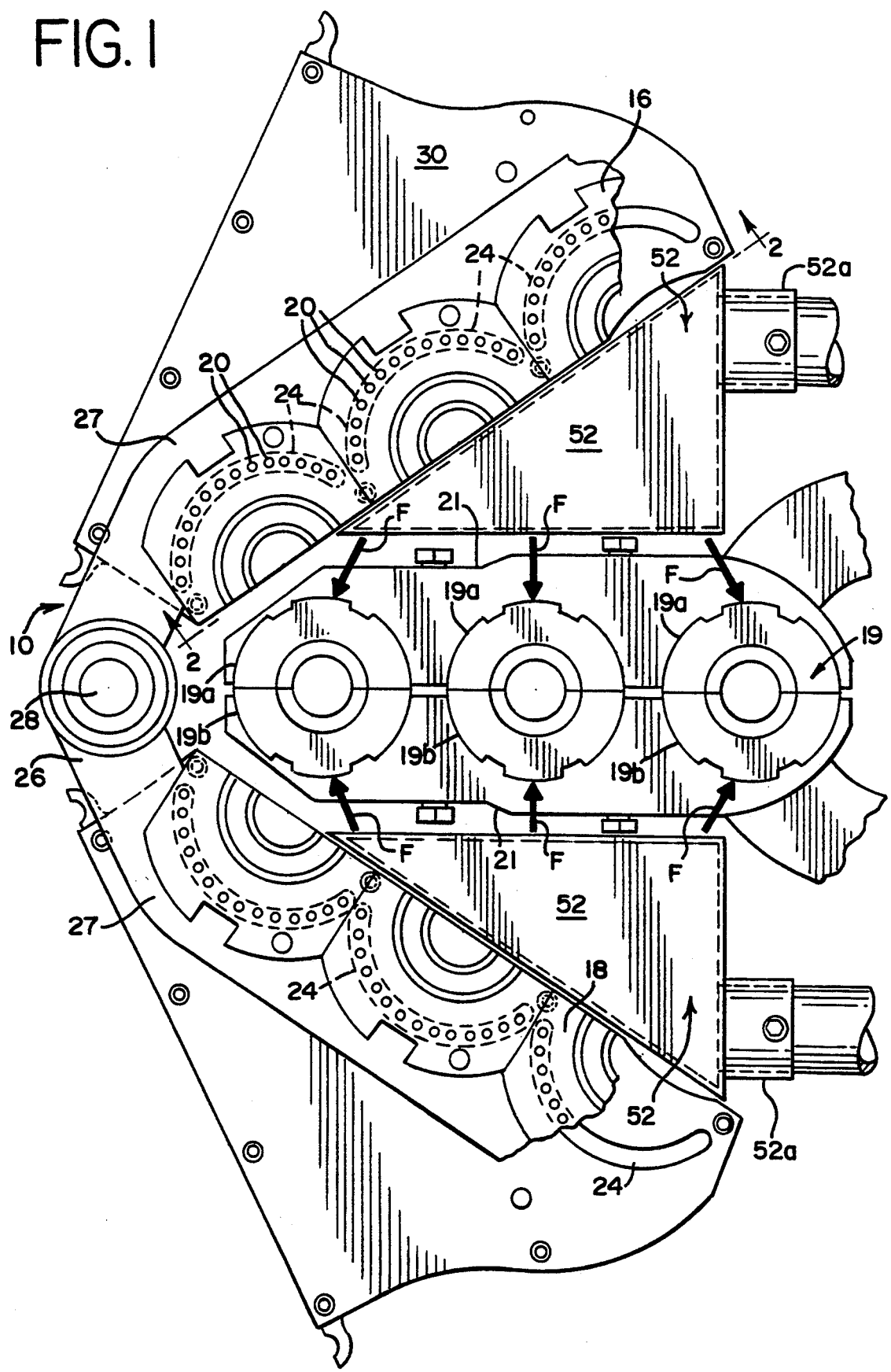
FIG. 1 is a plan view of a parison mold incorporating an air cooling mechanism in accordance with the present invention, and showing the mold halves of three parison molds pivoted away from each other and into a position above a parison mold air supply plenum cover.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to embodiments illustrated.

Figure 2:
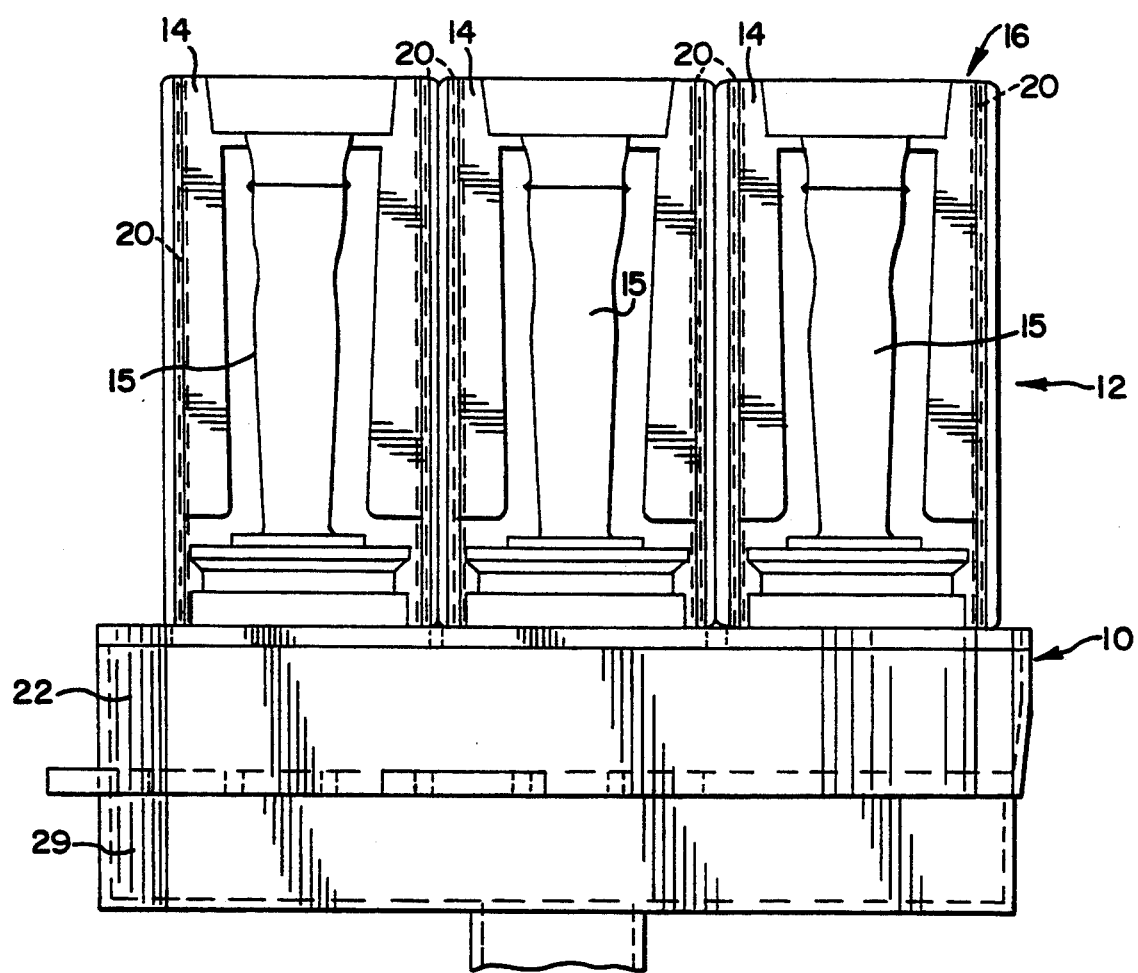
FIG. 2 is a side view of the mold halves of the three molds of FIG. 1, taken along lines 2—2 of that FIG. 1, and also showing the parison mold air supply plenum and its adjacent air supply means.

Referring now to the figures, an air cooling mechanism 10 for a conventional IS machine 12 for molding glass objects from molten glass, is disclosed. The mechanism 10 and the relevant portion of the IS machine are generally shown in FIGS. 1 and 2. The mechanism 10 and the IS machine 12 include a plurality of blanking or parison molds 14, and each of those molds have a plurality of air passages 20. Although the present embodiment contemplates the use of a parison mold 14, where a parison rather than the finished product is molded, it is contemplated that the mechanism 10 may also be advantageously used with a finishing mold.

Each parison mold comprises two mold halves 16 and 18. Because the mold halves and their function in relation to the present invention are identical, the mold halves 16 and 18 of only one of the molds 14 will be referred to in this discussion.

Each of these mold halves is mounted on a mechanical means 26 for moving them alternatively into engagement and away from each other. When the mold halves 16 and 18 are closed or in engagement, they together facilitate formation of the parison-forming cavity 15. When the mold halves 16 and 18 are drawn away from each other or opened, the parison is released for transport to the finishing mold (not shown). As may be best seen in FIG. 6, a separate split neck ring mold portion 19 is included for shaping the finish or threaded portion of the parison. The neck ring mold portion 19a is meshingly received in the parison mold halves 16 and 18 by a dove-tail connection 19c. A pair of such neck ring mold portions 19a and 19b are held together at each parison-forming station by a pair of supporting hanger arms 21 to form a neck ring mold 19 (See FIG. 7). The neck ring molds 19 are used as part of the transfer mechanism for transferring the finished parison into the finishing mold, as is well known in the art.

Air enters into the passage 20 of the mold 14 through its bottom, and particularly adjacent the split neck ring mold portions 19. As a result of the relatively straight and smooth flow path of the cooling air to the mold passages 20, the pressure of that air does not drop significantly, and efficient cooling of the neck area and the entire parison mold 14 is provided.

As may be seen in FIGS. 1 and 2, several of these parison molds 14 are typically arranged in close proximity to each other. FIG. 2 shows three such molds 14 adjacent to each other. In fact, current technology employs up to four of these molds 14 mounted in the contiguous manner shown in FIG. 1; however, additional molds 14 could be possible. Each of these parison molds 14 may be secured to the mechanism 26 for moving the mold halves 16 and 18 from their engaged position (See FIG. 7) to their spaced-apart retracted positions (FIG. 1). The support mechanism 26 includes a pair of hanger arms 27 pivoted on a fixed pivot pin 28 and movable between opened and closed positions by a suitable drive means (not shown).

Each parison mold 14 is made of a high heat conductivity material, and is generally a metallic substance. The molten glass which is poured into the parison mold 14 is at an extremely high temperature. In addition, each individual parison mold forms up to twenty or more of these parisons per minute As a result of these combined factors, the typical parison and finishing molds reach temperatures as high as 1200° and 1100° F., respectively. Without auxiliary cooling aids, the molds 14 could not readily disperse this heat through the ambient air. It is for this reason that an air cooling mechanism is necessary.

Figure 6:
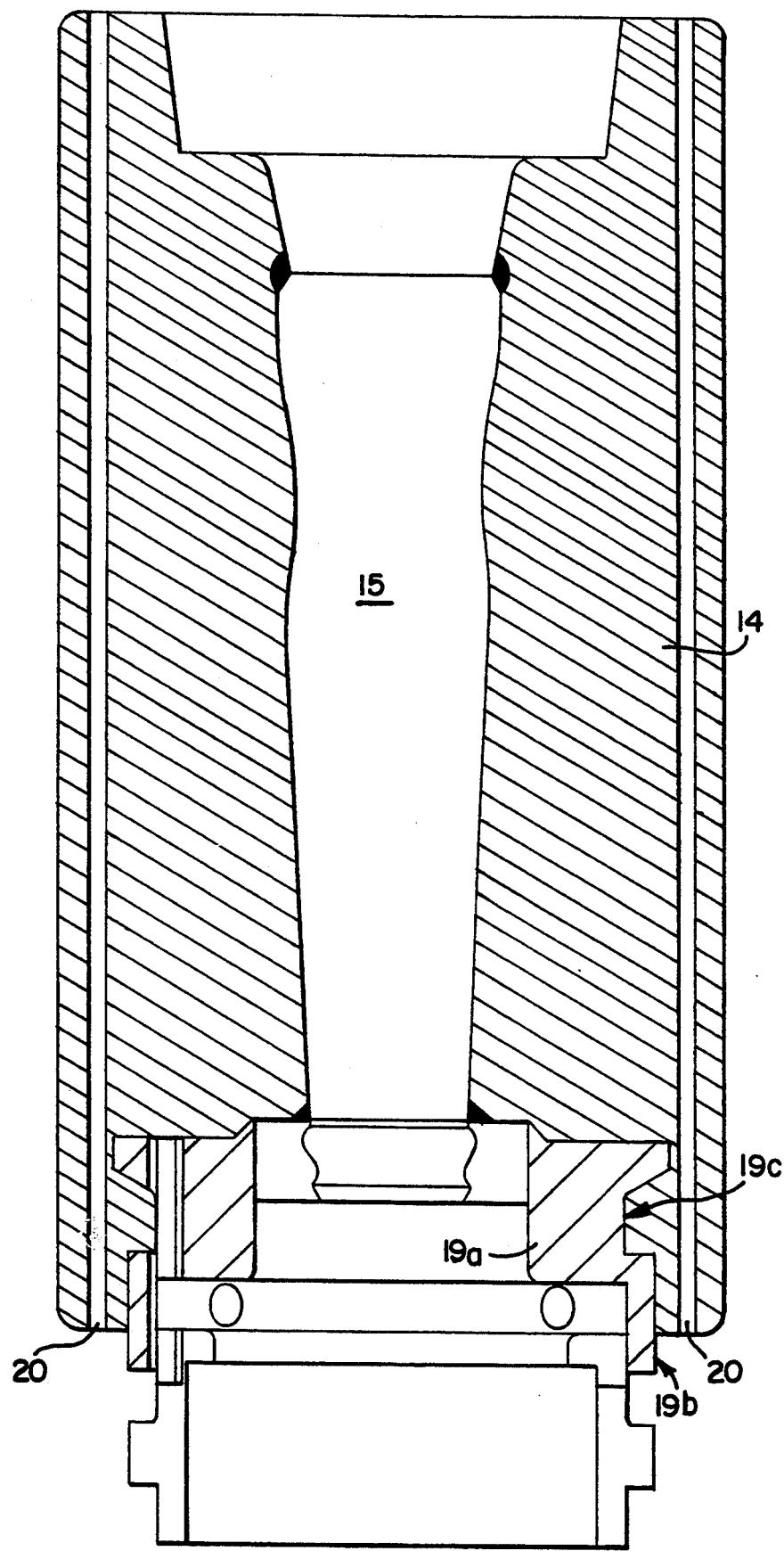
FIG. 6 is a partially cutaway side view of one of the three parison mold halves shown in the upper portion of FIG. 2, and showing engagement with half of a neck ring mold.

FIGS. 2 and 6 show side or sectional views of one of the two mold halves 16 and 18 of one of the outermost mold of FIG. 1. Air passages 20 are formed along and traverse the entire length of these mold halves 16 and 18. To ensure adequate heat transfer from these mold halves 16 and 18, the air passages 20 should be spaced a certain distance from each other. In the embodiment of FIG. 1 1, the axial centers of air passages 20 are disposed along a radial arc.

The axial cooling hole centers are spaced on radial centers generally equidistant from the mold cavity.

Figure 4:
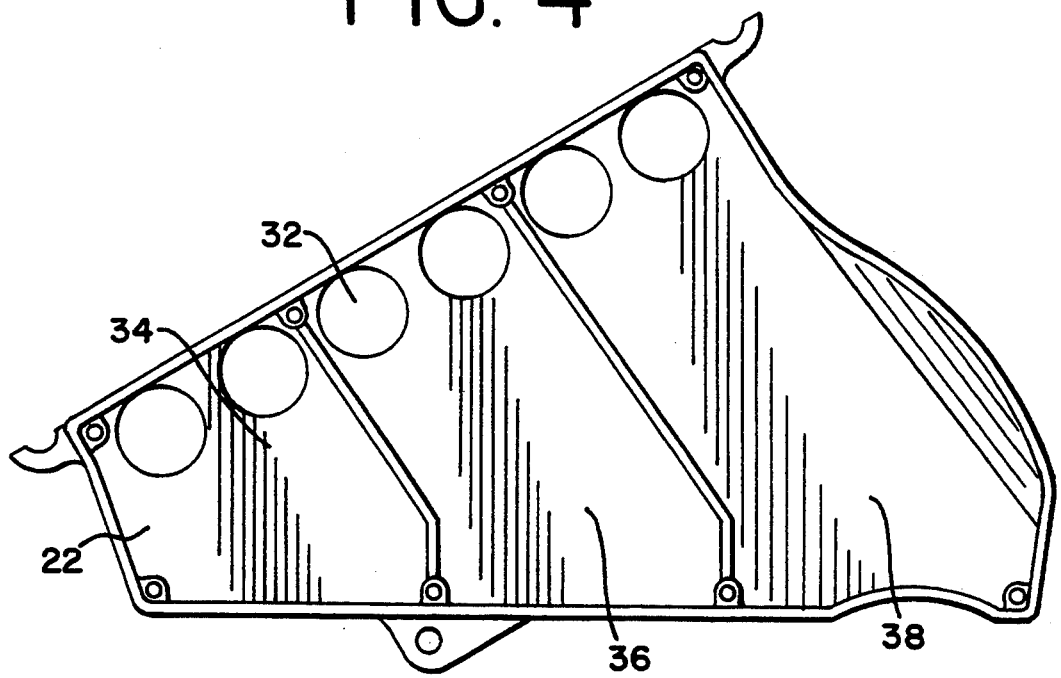
FIG. 4 is a top view of one embodiment of the parison mold air supply plenum, with the mold air supply plenum cover removed.
Figure 5:
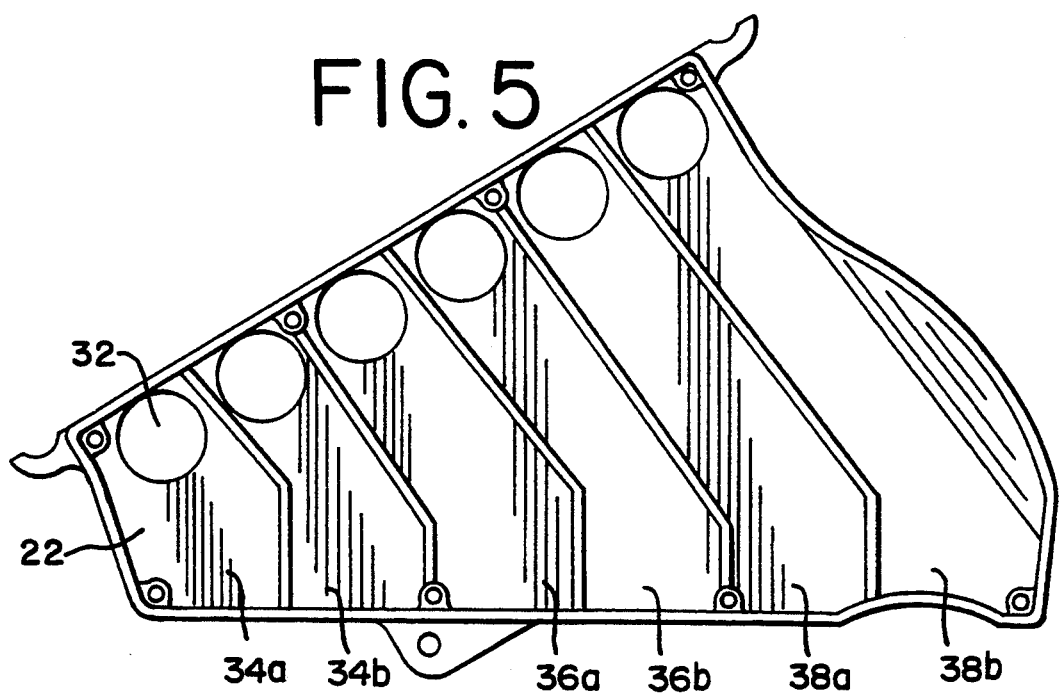
FIG. 5 is a top view of another embodiment of the parison mold air supply plenum, with the plenum cover removed.

The cooling source includes a fixed mold air supply plenum 22 which has a substantially unrestricted supply of pressurized cooling fluid or air delivered from a source, such as a cooling fan (not shown). As may be seen in FIG. 3, this mold air supply plenum 22 defines a pressure chamber which includes a mold air supply plenum cover 30 having a plurality of slots 24. High pressure air enters this fixed mold air supply plenum 22, and then moves towards this slot 24. This slot 24 serves as a discharge port for the air from the fixed mold air supply plenum 22, and facilitates its movement to the air passages 20 of the mold halves 16 and 18. Air supply means 29 (FIG. 2) provides pressurized air to the mold air supply plenum 22 through one of six ports 32 (FIGS. 4 and 5). Any type of regulating means (not shown) may be used to control the flow of air from supply means 29 to mold air supply plenum 22, and may be controlled by the timing mechanism to minimize pressurized air loss.

As indicated above and as shown in FIG. 1, pivot means 28 are provided for pivoting the mold halves 16 and 18 from a first, closed position where the mold halves form a cavity for an article or parison to be molded, to a second, open position away from the article to be molded. FIG. 1 shows these mold halves 16 and 18 in this second open position when the passages 20 are aligned with slots 24. The air enters the air passages 20 of the mold and cools the mold halves 16 and 18 only when those mold halves are in this second position.

In this second position, as may also be seen in this FIG. 1, one of the ends of each of a group of air passages 20 in each of the mold halves is in registry with a slot 24 in the mold air supply plenum cover 30. When the air passages 20 and the slot 24 are in registry, air moves from the ports 32 into the fixed mold air supply plenum 22 and upwardly towards the mold air supply plenum cover 30. The air exits the mold air supply plenum 22 through the slot 24, and then discharges into the air passages 20 of the corresponding mold 14.

Figure 3:
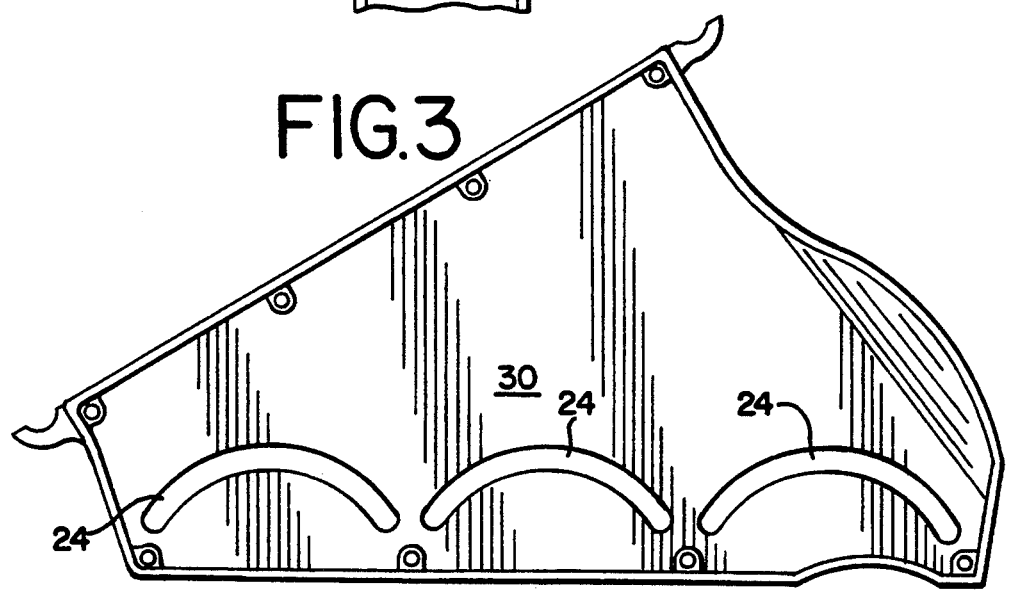
FIG. 3 is a top view of the parison mold air supply plenum cover.

In the embodiment, as shown in FIGS. 1 and 3, the slots 24 have an arcuate shape. In this way, each slot 24 overlies one end of each of the air passages 20 when that slot 24 and its respective group of air passages 20 are in registry.

In one embodiment, as shown in FIG. 4, the parison mold air supply plenum is divided into a plurality of channels 34, 36 and 38. Each of these channels terminates at a point defined by only one exit slot 24. Cooling air passes through each of the channels 34, 36 and 38 towards one of the slots 24 at one end of the channels for discharge into the air passages 20.

In this embodiment, the amount of air delivered to each slot 24 can be regulated by throttle valves (not shown) in entrance ports 32.

In yet another embodiment, as shown in FIG. 5, the mold air supply plenum is also divided into a plurality of channels 34a, 34b, 36a, 36b, 38a and 38b whereby each slot is fed by two channels, rather than one. As in the embodiment of FIG. 4, cooling air in the embodiment of FIG. 5 passes through each adjacent pair of channels (for example, channels 34a and 34b) and towards its corresponding slot 24 for discharge into the air passages. This latter embodiment acts as a means of throttling the volume of cooling air to a given mold half. If a lesser volume of air is to be sent to a given mold half, the operator may close the port 32 leading to one of the two channels, for example channel 34a, feeding each slot. With one port closed in this manner, the volume of air transported to the single slot 24 fed by channels 34a and 34b is halved. As will be appreciated from the above description, the fixed mold air supply plenums provide substantially unrestricted flow to the bottoms of the axial cooling openings without any significant pressure drops below the source pressure. Moreover, the openings 20 extend the entire length of the molds and therefore provide a measure of cooling of the neck ring mold 19 through conduction.

After the parison mold opens, the neck ring mold 19 is used to transport the parison to the finishing or blow mold side of the machine where the neck ring mold is opened by a parallel parting of two hanger arms 21, and the parison is placed into the blow mold.

Referring now to FIG. 7, it will be noted that a stand-off distance "d" is provided between the lower surface of the parison mold halves 16, 18 and the upper surfaces 21a of the ring mold hanger arms 21. The neck ring mold 19b is configured to provide an extension portion 56 which is accessible to external air. On either side of the neck ring mold hanger arms 21, a neck ring mold air supply 52 is disposed. Cooling air is supplied through air fittings 52a and exits through specially oriented wall passages 54 to direct a flow of cooling air at each neck ring mold half 19a and 19b shown in FIG. 7. It is contemplated that cooling air flow of approximately 20 cfm will adequately cool each of the neck rings at a normal production speed. The air flow generally indicated by F will be directed at the entire exposed length of the neck ring mold halves 19 when the parison molds 16, 18 are in a retracted position and will continue to supply air to the exposed extension 56 during the peak temperature cycle attendant to the forming of the parison.

While the specific embodiments have been illustrated and described, numerous modifications come to mind without markedly departing from the spirit of the invention The scope of protection is thus only intended to be limited by the scope of the accompanying claims.

We claim:

1. A glass molding machine comprising:
   a parison mold means,
   a movable hanger means;
   a neck ring mold means mounted on said movable hanger means; said hanger means and the neck ring mold means mounted thereon being adapted to move between a first position in operative molding relationship with said parison mold means and a second position outwardly from said parison mold means and out of operative molding relationship with said parison mold means;
   a cooling means positioned adjacent said first position of said neck ring mold means; said cooling means being adapted to direct a flow of cooling medium against said neck ring mold means when said neck ring mold means is in said first position whereby said neck ring mold means is subject to cooling medium flow while it is in said first position;
   said neck ring mold means having outer surfaces including an extension portion;
   said parison mold means being moveable between a closed position surrounding all but said extension portion of said neck ring mold means and an open position not surrounding said outer surfaces of said neck ring mold; and
   said cooling means being adapted to direct a flow of cooling medium against said extension portion when said parison mold means is in said closed position and to direct said flow of cooling medium toward all of said outer surfaces of said neck ring mold means including said extension portion when said parison mold means is in said open position.

2. The glass molding machine of claim 1 wherein said parison mold means includes parison mold halves each having lower surfaces and wherein said hanger means includes a pair of elongated parallel arms each having an outwardly facing side; said parallel arms each having top surfaces facing said lower surfaces of said parison mold halves when said parison mold means are in their closed positions to expose said extension portions to said cooling medium, said cooling means being configured to direct said flow of cooling medium at said neck ring mold means and at said extension portion from regions disposed adjacent at least one outwardly facing side of said pair of arms.

3. The glass molding machine of claim 2 wherein said cooling means is configured to direct said flow of cooling medium at said neck ring mold means from regions adjacent both outwardly facing sides of said pair of arms.

4. The glass molding machine of claim 1 including a pair of parison mold support means for supporting said parison mold means; each of said parison mold support means being mounted for movement in a path of movement between an open position where each is in a retracted station and a closed position where each comes together at a forming station; said cooling means including a pair of cooling medium supply plenums with one disposed between each of said retracted stations and said forming station; each said cooling medium supply plenums being adapted to be connected to a source of cooling medium; each of said cooling medium supply plenums having an upper wall, a lower wall, and sidewalls, each of said upper walls being disposed at a distance below said path of movement of said parison mold means, said sidewalls of each said cooling medium supply plenum being provided with flow-directing outlet apertures for directing a flow of cooling medium at said neck ring mold means when said neck ring mold means are in said first position.

5. A glass molding machine comprising:
   a pair of parison mold halves wherein each half is mounted for movement in a path of movement between a parison-forming station and a retracted station away from said parison-forming station;
   a pair of neck ring mold halves each having an upper exterior portion and a lower exterior extension portion, said neck ring mold halves each being mounted on a movable hanger means for movement between said parison-forming station and a blow station;
   said pair of parison mold halves closely surrounding said upper exterior portions of said pair of neck ring mold halves when said neck ring mold halves are in said parison-forming station; said lower exterior extension portions of said neck ring mold halves not being surrounded by said pair of parison mold halves; and
   a first cooling medium supply means fixedly positioned at a point between said parison-forming station and said retracted station whereby when said pair of parison mold halves and said pair of neck ring mold halves are in said parison-forming station said first cooling medium supply means is adjacent said lower exterior extension of said neck ring mold halves and directing a flow of cooling medium at said lower exterior extension portions whereby when said pair of parison mold halves are at said retracted station and said pair of neck ring mold halves are in said parison-forming station said first cooling medium supply means is directing a flow of cooling medium against said lower exterior extension portion of said neck mold halves and said upper exterior portion.

6. The glass molding machine of claim 5 wherein said parison mold halves each have a lower surface and wherein said hanger means include a pair of elongated parallel arms each having an outwardly facing side and each having a top surface facing said lower surface of said parison mold halves at a predetermined distance from said parison mold halves lower surface when said pair of parison mold halves and said pair of neck ring mold halves are in said parison-forming station to expose said lower exterior extension portions to cooling medium; said first cooling medium supply means being configured to direct said flow of cooling medium at said lower exterior extension portions from regions disposed adjacent at least one outwardly facing side of said pair of arms.

7. The glass molding machine of claim 6 wherein said first cooling medium supply means is configured to direct said flow of cooling medium at each said lower exterior extension portion from regions adjacent both outwardly facing sides of said pair of arms.

8. The glass molding machine of claim 5 including second cooling medium supply means for cooling each said parison mold half at said retracted stations, said second cooling medium supply means including cooling passages extending vertically through each said parison mold half and mold cooling medium supply plenums at each said retracted station adapted for connection to a source of cooling medium and having a top surface closely confronting a bottom surface of said parison mold halves when at said retracted stations, and exit passages in said mold cooling medium supply plenums disposed to supply cooling medium to said cooling passages.

9. The glass molding machine of claim 8 wherein said first cooling medium supply means includes a neck ring cooling medium supply plenum disposed between each of said retracted station and said parison-forming station and adapted for connection to a source of cooling medium, each of said neck ring cooling medium supply plenums having an upper wall, a lower wall, and sealing sidewalls, each of said upper walls being disposed out of the path of movement of said parison mold halves, said sidewalls of each said neck ring cooling medium supply plenums being provided with a flow-directing outlet aperture means for directing a flow of cooling medium at said upper exterior portion and said lower exterior extension portion of said neck ring mold halves.

10. A glass molding machine comprising:
a pair of parison mold halves with each half having a lower portion having an interior portion, each of said parison mold halves being mounted for movement between a parison-forming station and a retracted station away from said parison-forming station, each half of said pair of parison mold halves having associated therewith a neck ring mold half having an exterior configured for mating engagement with a portion of said interior portion of said lower portions of said parison mold halves, said neck ring mold halves having an extension portion extending out of said parison mold halves while in mating engagement with said parison mold halves, said neck ring mold halves engaging movable hanger means for holding said neck ring mold halves together at said parison-forming station; and cooling air supply means for directing a flow of cooling air at exterior surfaces of said extension portions at said parison-forming station, said cooling air supply means including a neck ring air supply plenum fixedly disposed between each of said retracted stations and said parison-forming stations and adapted for connection to a source of cooling air.

* * * * *